US012590238B1

(12) United States Patent
Israr et al.

(10) Patent No.: US 12,590,238 B1
(45) Date of Patent: Mar. 31, 2026

(54) AMPHOTERIC AMPHIPHILES FOR SHALE SWELLING INHIBITION IN OIL AND GAS RESERVOIRS

(71) Applicant: KING FAHD UNIVERSITY OF PETROLEUM AND MINERALS, Dhahran (SA)

(72) Inventors: Muhammad Israr, Dhahran (SA); Mobeen Murtaza, Khobar (SA); Muhammad Shahzad Kamal, Dhahran (SA); Syed Muhammad Shakil Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/204,000

(22) Filed: May 9, 2025

(51) Int. Cl.
*C09K 8/24* (2006.01)
*C09K 8/528* (2006.01)
*E21B 37/06* (2006.01)

(52) U.S. Cl.
CPC ................ *C09K 8/24* (2013.01); *C09K 8/528* (2013.01); *E21B 37/06* (2013.01); *C09K 2208/12* (2013.01)

(58) Field of Classification Search
CPC ...... C09K 8/24; C09K 8/528; C09K 2208/12; E21B 37/06
See application file for complete search history.

(56) References Cited

U.S. PATENT DOCUMENTS 6,247,543 B1 6/2001 Patel et al.
8,034,748 B2 * 10/2011 Dahlmann ................ C10L 3/06 507/131

(Continued)

OTHER PUBLICATIONS

Afeez Gbadamosi, et al., "Zwitterionic surfactant as Shale Swelling Inhibition Additive in Water-Based Drilling Mud", International Petroleum Technology Conference, Dhahran, Saudi Arabia, Feb. 12, 2024, 5 pages.

(Continued)

*Primary Examiner* — Alicia Bland
(74) *Attorney, Agent, or Firm* — Oblon, McClelland, Maier & Neustadt, L.L.P.

(57) ABSTRACT

A shale swelling inhibiting composition includes a water-based drilling mud and an amphiphilic polymer selected from the group including S1, S2, and combinations thereof. The structure of S1 is

S1

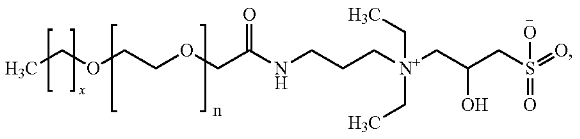

and the structure of S2 is,

S2

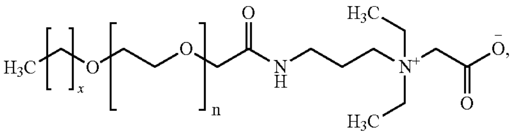

The shale swelling inhibiting composition includes from 0.01 weight percent (wt. %) to 20 wt % of the amphiphilic polymer based on the total weight of the shale swelling inhibiting composition, and x is in a range from 6 to 20 and n is in a range from 4 to 20.

2 Claims, 6 Drawing Sheets

S1 x = 11-13 Average Mn ~ 690

(56) References Cited

U.S. PATENT DOCUMENTS

| | | | |
|---|---|---|---|
| 11,866,641 | B2 | 1/2024 | Hussain et al. |
| 2004/0163307 | A1* | 8/2004 | Dahlmann ............ C10L 1/2222 44/405 |
| 2008/0045420 | A1 | 2/2008 | Karagianni et al. |
| 2010/0227781 | A1* | 9/2010 | Tej ........................... C09K 8/08 507/140 |
| 2021/0102113 | A1* | 4/2021 | Hussain ................ C07C 235/10 |
| 2024/0101886 | A1 | 3/2024 | Viganòet al. |

OTHER PUBLICATIONS

Zonglun Wang, et al., "An amphiphilic polymer as shale inhibitor in water-based drilling fluid", Journal of Physics: Conference Series, vol. 2353, 012002, The 4th International Conference on Graphene and Novel Nanomaterials (GNN 2022), 9 pages.

* cited by examiner

S1
x = 11-13 Average Mn ~ 690

S2
x = 11-13 Average Mn ~ 690

AMPHOTERIC AMPHIPHILES FOR SHALE SWELLING INHIBITION IN OIL AND GAS RESERVOIRS

BACKGROUND

Technical Field

The present disclosure is directed towards a composition, and more particularly, towards a shale swelling inhibiting composition including a water-based drilling mud and an amphiphilic polymer.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

During drilling operations, drilling muds perform functions such as transporting cuttings and stabilizing wellbore pressure during oil and gas exploration and production. Drilling fluids are primarily classified into water-based drilling mud (WBM) and oil-based drilling mud (OBM). Despite the high efficiency of drilling muds, OBM s remain less desirable due to toxicity concerns and the high cost of remediating mud drill cuttings before disposal [Agi, A. et al., Microwave assisted technique for oil recovery from oily sludge shale drilled cuttings, paper presented at the SPE Nigeria Annual International Conference and Exhibition, Lagos, Nigeria, 2023]. WBMs recently gained attention due to environmentally benign properties [Oseh J. et al., Effect of Modified Hydroxyapatite Nanoparticles on Sodium and Calcium Cation-Contaminated Bentonite-Water Solutions at High Temperatures, *Arab J Sci Eng,* 48, 16989-17021, 2023]. However, the absorption of water from WBMs by shale intensifies swelling, leading to wellbore instability and reduced operational efficiency. Wellbores drilled for hydrocarbons typically contain shale components and other rock minerals. Shale, predominantly composed of clay minerals, exhibit high sensitivity to water and high adsorption capacity [Jia, H. et al, Investigation of inhibition mechanism of three deep eutectic solvents as potential shale inhibitors in water-based drilling fluids, *Fuel*, Volume 244, 2019, pages 403-411]. During drilling operations, the interaction between the WBM and clay causes the dispersion of clay into ultra-fine colloidal particles. This interaction leads to clay hydration and the shale swelling process, weakening the wellbore structure. Furthermore, an increase in pore pressure and a reduction in rock strength occurs, resulting in wellbore instability and an increased risk of well blowout.

To mitigate shale swelling issues, shale swelling inhibition additives are incorporated into WBMs. Conventional inhibitors include salts, polymers, nanoparticles, and ionic liquids [Murtaza, M., et al., A magnetic surfactant having one degree of unsaturation in the hydrophobic tail as a shale swelling inhibitor, *Molecules,* 2023, 28, 4, 1878]. Recently, surfactants were evaluated and utilized as shale swelling inhibition additives with varying degrees of effectiveness [Ahmad, H., et al., Cationic gemini surfactants containing biphenyl spacer as shale swelling inhibitor, *Journal of Molecular Liquids*, Volume 325, 2021, 115164]. Researchers reported that cationic surfactants exhibited better shale inhibition properties compared to conventional clay hydration inhibitors. Similarly, cationic gemini surfactants and magnetic surfactants demonstrated moderate effectiveness in inhibiting shale swelling [Ahmad, H., et al., Application of novel magnetic surfactant-based drilling fluids for clay swelling inhibition, *Energy Fuels,* 2023, 37, 12, 8212-8223]. Despite various drawbacks, water-based shale drilling remains a useful technique for resource extraction. Effective drilling alterations mitigate shale swelling, enhance wellbore stability, and improve drilling efficiency. By addressing shale hydration and instability, modifications may provide smoother operations and better resource recovery.

Recent advancements in shale drilling emphasize the importance of incorporating additives such as surfactants, defoaming agents, detergents, chelators, and buffers to enhance drilling efficiency and stabilize the wellbore. However, the environmental impact of drilling fluid disposal and the limited effectiveness of existing inhibitors remain challenges. Addressing these issues requires developing advanced drilling fluid technologies and eco-friendly additives to effectively mitigate shale swelling and enhance wellbore stability.

Accordingly, one object of the present disclosure is to provide a composition for inhibiting shale swelling in a wellbore using an amphiphilic polymer, that may circumvent the drawbacks and limitations, such as, high-toxicity, low bioavailability, and low efficiency, of the methods and materials known in the art.

SUMMARY

In an exemplary embodiment, a shale swelling inhibiting composition is described. The shale swelling composition includes a water-based drilling mud and an amphiphilic polymer selected from the group including S1, S2, and combinations thereof. The structure of S1 is

S1

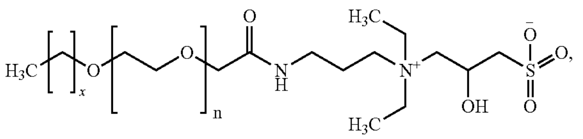

and the structure of S2 is,

S2

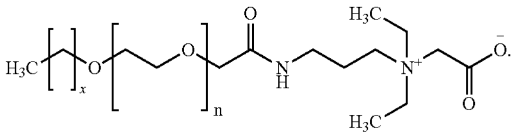

The shale swelling inhibiting composition includes from 0.01 weight percent (wt. %) to 20 wt. % of the amphiphilic polymer based on the total weight of the shale swelling inhibiting composition, and x is in a range from 6 to 20 and n is in a range from 4 to 20.

In some embodiments, the composition includes x in a range from 8 to 16 and n is in a range from 5 to 13.

In some embodiments, the composition includes x in a range from 10 to 14 and n is in a range from 7 to 11.

In some embodiments, the composition includes x in a range from 11 to 13 and n is in a range from 8 to 10.

In some embodiments, the water-based drilling mud includes bentonite particles and water.

In some embodiments, the water-based drilling mud further includes one or more additives selected from the group including barite, a weighting agent, and a proppant.

In some embodiments, the water-based drilling mud further includes one or more additives selected from the group including a viscosity modifier, a corrosion inhibitor, a loss circulation material, a tracing material, and a scale inhibitor.

In some embodiments, the composition has a viscosity in a range from 5 centipoise (cP) to 15 cP measured at 500 second inverse ($s^{-1}$).

In some embodiments, the composition has a viscosity in a range from 7 cP to 12 cP measured at 500 $s^{-1}$.

In some embodiments, the composition has a viscosity in a range from 8 cP to 10 cP measured at 500 $s^{-1}$.

In some embodiments, the composition has a viscosity in a range from 5 cP to 25 cP measured at 1000 $s^{-1}$.

In some embodiments, the composition has a viscosity in a range from 7 cP to 20 cP measured at 1000 $s^{-1}$.

In some embodiments, the composition has a viscosity in a range from 8 cP to 15 cP measured at 1000 $s^{-1}$.

In some embodiments, the bentonite particles are dispersed in the water and have a zeta potential in a range from −30 millivolts (mV) to −10 mV.

In some embodiments, the bentonite particles are dispersed in the water and have a zeta potential in a range from −25 mV to −15 mV.

In another exemplary embodiment, a method of scale inhibition using the aforementioned shale swelling inhibiting composition is described. The method includes delivering the shale swelling inhibiting composition to a wellbore or a target zone downhole. The shale swelling inhibiting composition includes from 0.05 wt. % to 5 wt. % amphiphilic polymers based on the total weight of the shale swelling inhibiting composition.

In some embodiments, the shale swelling inhibiting composition includes from 0.1 wt. % to 1 wt. % amphiphilic polymer based on the total weight of the shale swelling inhibiting composition.

In some embodiments, the bentonite particles have a percent swelling after 24 hours (h) of less than or equal to 105%.

In some embodiments, the bentonite particles have a percent swelling after 24 h of less than or equal to 103%.

In some embodiments, the bentonite particles have a percent swelling after 24 h of less than or equal to 99%.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
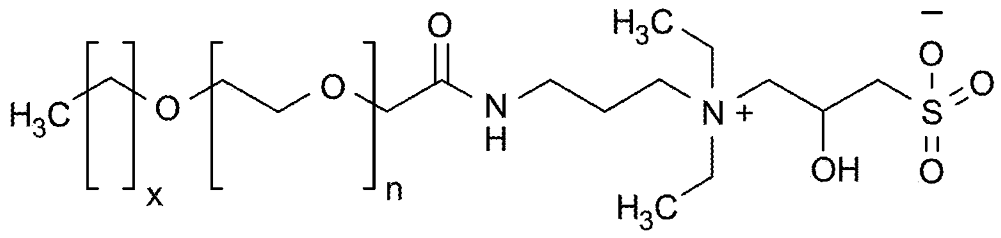
FIG. 1 illustrates a chemical structure of the amphoteric amphiphile S1 [$C_{43}H_{88}N_2O_{15}S$], according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

As used herein, the terms 'compound', 'surfactant', and 'product' are used interchangeably, and are intended to refer to a chemical entity, whether in the solid, liquid or gaseous phase, and whether in a crude mixture or purified and isolated.

As used herein, the term 'surfactant' refers to a compound that lowers the surface tension (or interfacial tension) between two liquids, between a liquid and a gas, or between a liquid and a solid. The surfactant may also be a gemini surfactant of any of the types listed previously. The surfactant may serve a role as a water-wetting agent, a defoamer, a foamer, a detergent, a dispersant, or an emulsifier.

As used herein, the term 'viscosity' refers to a measure of a fluid's resistance to flow. It indicates how thick or thin a fluid is, with high viscosity meaning the fluid flows slowly (such as honey), and low viscosity meaning the fluid flows easily (such as water). In drilling fluids, viscosity plays a role in carrying cuttings to the surface, lubricating the drill bit, and maintaining the stability of the wellbore.

As used herein, the term 'zeta potential' refers to the electrical potential difference between the dispersion medium (usually liquid) and the charged particles within a colloidal system. It is a measure of the stability of colloidal dispersions, such as suspensions or emulsions. A high zeta potential (either positive or negative) indicates strong repulsion between particles, which helps to prevent aggregation or settling, thereby stabilizing the system. A low zeta potential indicates weak repulsion, which can lead to particle clumping or instability.

As used herein, 'subterranean reservoir' refers to a geological structure or cavity that can store water, natural gas, or other substances.

As used herein, the term 'drilling fluid' refers to a mixture of chemicals, clay, oil, or water that's circulated around a drill bit during oil and gas drilling. In the present disclosure, 'drilling fluid', 'drilling mud', and 'base mud (BM)' have been used interchangeably.

As used herein, the term 'aqueous drilling fluid' refers to a drilling fluid in which water is the primary continuous phase. In the present disclosure, 'aqueous drilling fluid' and 'water-based mud (WBM)' have been used interchangeably.

As used herein, the term 'rheological properties' refers to material properties that describe how a material deforms or flows at the application of a force or stress.

As used herein, the term 'shale' refers to materials such as certain types of clays (for example, bentonite) and related subterranean materials that may 'swell', or increase in volume, when exposed to water. Reactive shales can pose challenges during drilling operations due to their tendency to deteriorate when in contact with aqueous media, such as water-based drilling fluids. This degradation, including swelling, can create unfavorable drilling conditions and interfere with the drilling fluid's effectiveness.

As used herein, the term 'shale swelling' refers to an increase in volume of shale particles due to water absorption which affects their physical and mechanical properties.

As used herein, the term 'shale swelling inhibition' refers to the use of chemicals or treatments to reduce the volume increase of shale when it absorbs water, enhancing stability and performance.

As used herein, the term 'shear' refers to the stress used to cause the fluid to flow or change form.

As used herein, the term 'shear rate' refers to the rate at which a material is deformed due to a velocity gradient.

As used herein, the term 'amphoteric amphiphiles' refers to molecules that exhibit both acidic and basic behavior, depending on the surrounding environment. Additionally, they have both hydrophilic (water-attracting) and hydrophobic (water-repelling) regions, enabling them to interact with both water and oil.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

Aspects of the present disclosure are directed to a shale swelling inhibiting composition including a water-based drilling mud and an amphiphilic polymer. The amphiphilic polymer is an amphoteric amphiphile selected from lauryl polyoxyethylene amidopropyl hydroxy sulfobetaine (S1) or lauryl polyoxyethylene amidopropyl carboxybetaine sulfonate (S2), providing an environmentally friendly and efficient solution for enhancing stability and performance during hydrocarbon drilling. The addition of S1 and S2 also influences the electrokinetic properties, particle size, and rheological behavior of the WBM, demonstrating their efficiency in mitigating shale swelling.

A shale swelling inhibiting composition is described. A shale swelling inhibiting composition is a chemical formulation designed to prevent or reduce the swelling of shale formations during drilling operations. When water-based drilling fluids come into contact with shale, the clay particles in the shale can absorb water and expand, potentially leading to problems such as wellbore instability. Shale swelling inhibiting compositions typically include inhibitors such as salts, polymers, or other chemical agents that prevent water absorption by the shale, thus reducing swelling and maintaining the integrity of the wellbore during drilling. This helps improve drilling efficiency and safety.

In one or more embodiments, the shale swelling inhibiting composition includes a water-based drilling mud. As used herein, the term 'water-based drilling mud' refers to a type of drilling fluid used in the process of drilling wells, particularly in the oil and gas industry. It primarily consists of water mixed with various additives such as clays, polymers, and other chemicals. This type of drilling mud helps to cool and lubricate the drill bit, carry rock cuttings to the surface, and maintain pressure control in the well. Water-based drilling mud is environmentally friendly compared to oil-based alternatives and is commonly used for shallow to medium-depth drilling operations.

In one or more embodiments, the shale swelling inhibiting composition includes an amphiphilic polymer. The dual nature of amphiphilic polymers allows interaction with both aqueous and non-aqueous environments, enabling amphiphilic polymers to self-assemble into various structures, such as micelles, vesicles, or films.

In one or more embodiments, the amphiphilic polymer is selected from the group consisting of S1, S2, and combinations thereof. The structure of S1 is:

S1

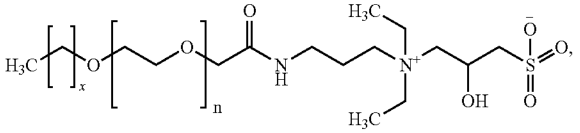

the structure of S2 is:

S2

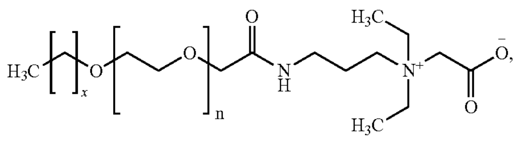

The shale swelling inhibiting composition includes from 0.01-40 wt. %, preferably 0.01-20 wt. %, preferably 0.05-15 wt. %, preferably 0.1-10 wt. %, and preferably 0.5-5 wt. % of the amphiphilic polymer based on the total weight of the shale swelling inhibiting composition. In some embodiments, x is in a range from 4-30, preferably 6-20, preferably 7-19, preferably 8-16, preferably 9-17, preferably 10-14, preferably 11-13, and n is in a range from 2-30, preferably 4-20, preferably 5-19, preferably 5-13, preferably 7-11, preferably 8-10. In some embodiments, x is in a range from 11-13, and preferably 12 and n is in a range from 8-10, and preferably 9.

The water-based drilling mud includes bentonite particles and water. The 'bentonite' may refer to potassium bentonite, sodium bentonite, calcium bentonite, aluminum bentonite, and combinations thereof, depending on the relative amounts of potassium, sodium, calcium, and aluminum in the bentonite. The bentonite acts as a viscosifier. A viscosifier is an additive of the water-based drilling mud that increases the viscosity of the water-based drilling mud. In some embodiments, the bentonite may be substituted by other viscosifiers that may include, but are not limited to, sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (such as attapulgite, sepiolite), and combinations thereof.

The water-based drilling mud further includes one or more additives selected from the group consisting of a viscosity modifier, a corrosion inhibitor, a loss circulation material, a tracing material, and a scale inhibitor. The water-based drilling mud may contain various additives to enhance its performance during drilling operations. Viscosity modifiers such as xanthan gum, bentonite clay, or polyacrylamide are used to adjust the flow properties and provide desired mud consistency. Corrosion inhibitors, such as zinc carbonate or amine-based compounds, protect metal equipment from corrosive damage caused by the drilling fluid. Loss circulation materials, such as cement, micas, or cellulose fibers, help prevent the loss of drilling fluid into porous formations by sealing fractures. Tracing materials, such as fluorescent dyes or radioactive tracers, are added to monitor fluid movement and distribution. Scale inhibitors, such as phosphonates or polymeric dispersants, prevent the buildup of mineral scales in pipes and equipment, providing smooth operation throughout the drilling process.

In some embodiments, the water-based drilling mud may also include a deflocculant. Deflocculant is an additive of the water-based drilling mud that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho.

In some embodiments, the water-based drilling mud may also include a lubricant. In some embodiments, LUBE 10170B may be used as the lubricant. In some embodiments, the lubricant may include, but is not limited to, polyalphaolefin (PAO), synthetic esters, polyalkylene glycols (PAG), phosphate esters, alkylated naphthalenes (AN), silicate esters, ionic fluids, and multiply alkylated cyclopentanes (MAC).

In some embodiments, the water-based drilling mud may also include a crosslinker. The crosslinker is an additive of the water-based drilling mud that can react with multiple-strand polymers to couple molecules together, thereby creating a highly viscous fluid, with a controllable viscosity. The crosslinker may include, but is not limited to, metallic salts, such as salts of aluminum (Al), iron (Fe), boron (B), titanium (Ti), chromium (Cr), and zirconium (Zr), or organic crosslinkers such as polyethylene amides and formaldehyde.

In some embodiments, the water-based drilling mud may also include a breaker. The breaker is an additive of the water-based drilling mud that provides a desired viscosity reduction in a specified period. The breaker may include, but is not limited to, oxidizing agents, such as sodium chlorites, sodium bromate, hypochlorites, perborate, persulfates, peroxides, and enzymes.

In some embodiments, the water-based drilling mud may include a biocide. The biocide is an additive of the water-based drilling mud that may kill microorganisms present in the water-based drilling mud. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanediol.

The water-based drilling mud may also include a corrosion inhibiting agent. The corrosion inhibiting agent is a chemical compound that decreases the corrosion rate of a material, more preferably, a metal or an alloy, that meets the water-based drilling mud. In some embodiments, the corrosion inhibiting agent may include, but is not limited to, imidazolines, and amido amines. In some embodiments, the corrosion inhibiting agent may include, but is not limited to, oxides, sulfides, halides, nitrates, preferably halides, of metallic elements of group IIIa to VIa such as $SbBr_3$.

The water-based drilling mud may also include an anti-scaling agent. The anti-scaling agent is an additive of the water-based drilling mud that inhibits the formation and precipitation of crystallized mineral salts that form scale. The anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the water-based drilling mud may include metal sulfide scale removal agents such as hydrochloric acid.

The water-based drilling mud may also include a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA). The concentration of components of the water-based drilling mud may be varied to impart desired characteristics of the water-based drilling mud.

The water-based drilling mud may also include a fluid loss prevention agent. The fluid loss prevention agent is an additive of the water-based drilling mud that controls loss of the water-based drilling mud when injected into the subterranean geological formation. In some embodiments, the water-based drilling mud may include multiple fluid loss prevention agents depending on the customized needs of a user. In some embodiments, the other fluid loss prevention agents, such as polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids, may be used as well.

The water-based drilling mud may also include a chloride salt such as sodium chloride, lithium chloride, rubidium chloride, and cesium chloride. In some embodiments, the chloride salt acts as a shale stabilizer. The water-based drilling mud may also include an emulsifier. In a preferred embodiment, the emulsifier is sodium sulfonate, such as sodium dodecane-1-sulfonate, sodium decane-1-sulfonate, sodium octadecane-1-sulfonate, 1-octanesulfonic acid. The emulsifiers are utilized to enhance the dispersion of the scavenger.

In some embodiments, the water may be tap water, distilled water, bi-distilled water, deionized water, deionized distilled water, reverse osmosis water, hard water, fresh water, brine/salt water and combinations thereof. The hard water and the freshwater may include salts of sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In one or more embodiments, the water-based drilling mud further includes one or more additives selected from the group consisting of barite, a weighting agent, and a proppant. Barite is a dense mineral (barium sulfate, $BaSO_4$) commonly used as a weighting agent in drilling fluids. It helps increase the density of the fluid to control pressure in the wellbore, preventing blowouts during drilling operations. As used herein, the term 'weighting agent' refers to a material added to drilling fluids to increase their density. This helps control downhole pressure, stabilize the wellbore, and prevent formation fluids from entering the well. As used herein, the term 'proppant' refers to a material, typically sand or ceramic beads, used in hydraulic fracturing (fracking) to keep fractures in rock formations open after they are created. This allows oil or gas to flow more freely from the reservoir to the well.

In some embodiments, the composition has a viscosity in a range from 1-25 centipoise (cP), preferably 5-15 cP, preferably 6-14 cP, preferably 7-12 cP, and preferably 8-10 cP when measured at 500 second inverse ($s^{-1}$). In one or more embodiments, the composition has a viscosity in a range from 8-10 cP, preferably 9.04 cP, more preferably 8.18 cP when measured at 500 $s^{-1}$. In one or more embodiments, the composition has a viscosity in a range from 1-30 cP, preferably 5-25 cP, preferably 6-24 cP, preferably 7-20 cP, preferably 8-15 cP, when measured at 1000 $s^{-1}$. In one or more embodiments, the composition has a viscosity in a range from 8-15 cP, preferably 9-14 cP, preferably 10-13 cP, preferably 11-12 cP, and more preferably 13.96 cP when measured at 1000 $s^{-1}$.

In one or more embodiments, when the bentonite particles are dispersed in the water, the bentonite particles have a zeta potential in a range from −50 to −5 millivolts (mV), preferably −30 to −10 mV, preferably −29 to −11 mV, preferably −28 to −12 mV, preferably −27 to −13 mV, preferably −26 to −14 mV, preferably −25 to −15 mV. In one or more embodiments, when the bentonite particles are dispersed in the water, the bentonite particles have a zeta potential in a range from −25 to −15 mV, preferably −24.41 mV, and preferably −16.25 mV.

A method of scale inhibition using the shale swelling inhibiting composition is described. In one or more embodiments, the method includes delivering the shale swelling inhibiting composition to a wellbore or a target zone downhole. In one or more embodiments, the wellbore may be present in an oil well, a gas well, a production well, an injection well, a naturally flowing well, an artificially lifted well, a high-temperature well, a steam-assisted gravity drainage well, a steam injector well, or a geothermal well. The wellbore may be formed by known techniques. In some embodiments, the well may be a horizontal well, a vertical well, and a multilateral well.

In one or more embodiments, the shale swelling inhibiting composition includes from 0.01 to 40 wt. %, preferably 0.05 to 5 wt. %, preferably 0.075-2.5 wt. %, preferably 0.1 to 1 wt. % amphiphilic polymer based on the total weight of the shale swelling inhibiting composition. In one or more embodiments, the shale swelling inhibiting composition includes from 0.1-1 wt. %, preferably 0.2-0.9 wt. %, preferably 0.3-0.8 wt. %, preferably 0.4-0.7 wt. %, preferably 0.5-0.6 wt. %, and more preferably 0.5 wt. % amphiphilic polymer based on the total weight of the shale swelling inhibiting composition.

In one or more embodiments, the bentonite particles have a percent swelling after 24 hours (h) of less than or equal to 105%. In some embodiments, the bentonite particles have a percent swelling after 24 h of less than or equal to 103%. In some embodiments, the bentonite particles have a percent swelling after 24 h of less than or equal to 99%.

EXAMPLES

The following examples demonstrate a composition for inhibiting shale swelling in a wellbore. The examples are provided solely for illustration and are not to be construed as limitations of the present disclosure, as many variations thereof are possible without departing from the spirit and scope of the present disclosure.

Example 1: Materials and Methods

Figure 2:
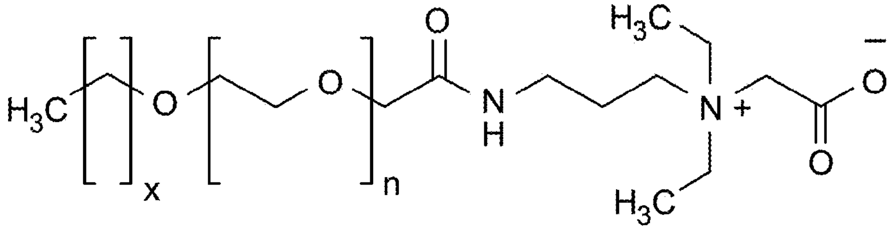
FIG. 2 illustrates a chemical structure of the amphoteric amphiphile S2 [$C_{42}H_{84}N_2O_{13}$], according to certain embodiments.

In the present disclosure, two amphoteric amphiphiles were developed to serve as shale swelling inhibitors. The chemical structures of these amphiphiles are shown in FIG. 1 and FIG. 2. Table 1 provides the identification of the amphoteric amphiphiles denoted as S1 and S2. The preparation of the drilling mud carried out by mixing 6.0 weight percent (wt. %) bentonite with deionized (DI) water using a Hamilton Beach mixer, following the American Petroleum Institute (API) standard. Further, for the preparation of surfactant-enhanced water-based mud (WBM), 0.5 wt. % of one of the amphoteric amphiphile was added to the base drilling mud. The formulated drilling mud was then aged under ambient conditions for 24 h before testing.

TABLE 1

| Properties of amphoteric amphiphiles S1 and S2. | | |
|---|---|---|
| Property | S1 | S2 |
| Chemical formula | $C_{43}H_{88}N_2O_{15}$ | $C_{42}H_{84}N_2O_{13}$ |
| Functional groups | Amide, quaternary ammonium, sulfonate | Amide, quaternary ammonium, carboxylate |
| Molecular weight (grams per mole (g/mol)) | 905.24 | 825.14 |
| Solubility | Soluble in distilled water, seawater, and formation water | Soluble in distilled water, seawater, and formation water |
| Thermal stability (° C.) | 282 | 296 |

Example 2: Shale Swelling Test

To assess the effectiveness of the synthesized amphiphiles as shale hydration inhibition additives, a linear shale swelling test was conducted using an oilfield testing & equipment (OFITE) dynamic swell meter. The procedure involved preparing a clay wafer by compressing 12 grams (g) of bentonite clay at 6000 pounds per square inch (psi) for 15 minutes (min). Subsequently, the clay wafer was immersed separately in DI water and surfactant-mixed solutions for a period of 24 hours (h). Changes in the clay wafer's height were measured using a linear variable differential transformer (LVDT) connected to the system. Throughout the linear swelling test, the solutions were continuously stirred. The system's built-in software recorded the swelling percentage over time. The performance of the amphiphiles (S1 and S2) was evaluated and compared to chlorine chloride (CC), a commercial swelling inhibitor.

Example 3: Zeta Potential and Particle Size Measurement

Zeta potential, a useful parameter in characterizing the electrokinetic potential of solid-liquid dispersions, was accurately measured using the Anton Paar Litesizer 500, through electrophoresis techniques. The zeta potential measurements provided valuable insights into the colloidal stability, surface charge, and surface modification. The present disclosure examined three different formulations containing bentonite clay. The first formulation used as the baseline included 0.5 wt. % bentonite clay dispersed in DI water. In the second formulation, bentonite was dispersed in a 0.5 wt. % solution of amphiphile S1, while in the third formulation, bentonite was mixed with 0.5 wt. % solution of amphiphile S2. The dispersions were made by carefully mixing the components, followed by 24 h aging period at ambient temperature to achieve complete interaction between clay and media. Subsequently, the samples were centrifuged for 5 minutes at 3000 revolutions per minute (rpm) under ambient conditions. The supernatant from each sample was collected for zeta potential analysis. Particle size distribution of all the samples was measured using a Fritsch Laser Particle Sizer ANALYSETTE 22. Previous to measuring particle size distribution, the samples were homogenized using a Hamilton Beach mixer to provide complete dispersion. The analysis provided comprehensive measurements, including median particle size (D50) and the differential distribution profile of all three samples.

Example 4: Capillary Suction Timer Test

The capillary suction timer (CST) test is a laboratory technique used to evaluate the water absorption and swelling characteristics of clay and other fine-grained materials. The CST test measured the time required for water to be absorbed by a clay slurry through capillary action, providing insights into the material's permeability, swelling potential, and interaction with various fluids. To evaluate the swelling characteristics of sodium bentonite in various solutions, 0.5 grams of sodium bentonite were dispersed into 100 milliliters (mL) of each test solution, which included DI water, a CC solution, and amphiphile solutions S1 and S2. The mixtures were stirred continuously for 24 h to provide complete hydration and uniform dispersion of the clay particles. Subsequently, a piece of porous filter paper was placed on the glass plate of the CST apparatus. 5 ml of the hydrated clay suspension was then carefully poured into the CST funnel, causing the slurry to come into contact with the filter paper at the bottom of the funnel. The timer was started immediately upon contact of the filtrate with the first electrode, allowing the water to be absorbed by the filter paper through capillary action. The movement of the waterfront was monitored as it was absorbed by the filter paper, and the time taken for the waterfront to travel a predetermined radial distance between the electrodes on the filter paper was measured and recorded as the CST. The recorded CST values were then analyzed to evaluate the water absorption and swelling behavior of the clay. A shorter CST indicated better inhibition of the fluid uptake, while a longer CST indicated the clay absorbed more water and swelled.

Example 5: Rheology Measurement

To examine the deformation behavior of the drilling fluids, rheological tests were conducted using a thermal analysis (TA) Instruments rheometer. The shear stress versus shear rate profiles were measured for both the water-based mud (WBM) and amphiphiles-enhanced muds. The shear rate was systematically varied from 0.1 second inverse ($s^{-1}$) to 1000 $s^{-1}$, and the corresponding shear stresses were recorded to characterize the flow characteristics of the fluids. Additionally, the apparent viscosity as a function of shear rate was also reported. The viscosities of all the muds were specifically measured at a shear rate of 511 $s^{-1}$ to assess the impact of amphiphile addition on the viscosity of base mud (BM).

Example 6: Dispersion Test

The dispersion test was conducted to measure the behavior of clay particles in different aqueous solutions using vials for visual observation. Clay was mixed at a concentration of 0.5 wt. % in DI, S1, S2, and CC solutions. After thoroughly mixing, the solution vials were kept static under room conditions, and the clay dispersions were visually observed for 24 h.

Figure 3A:
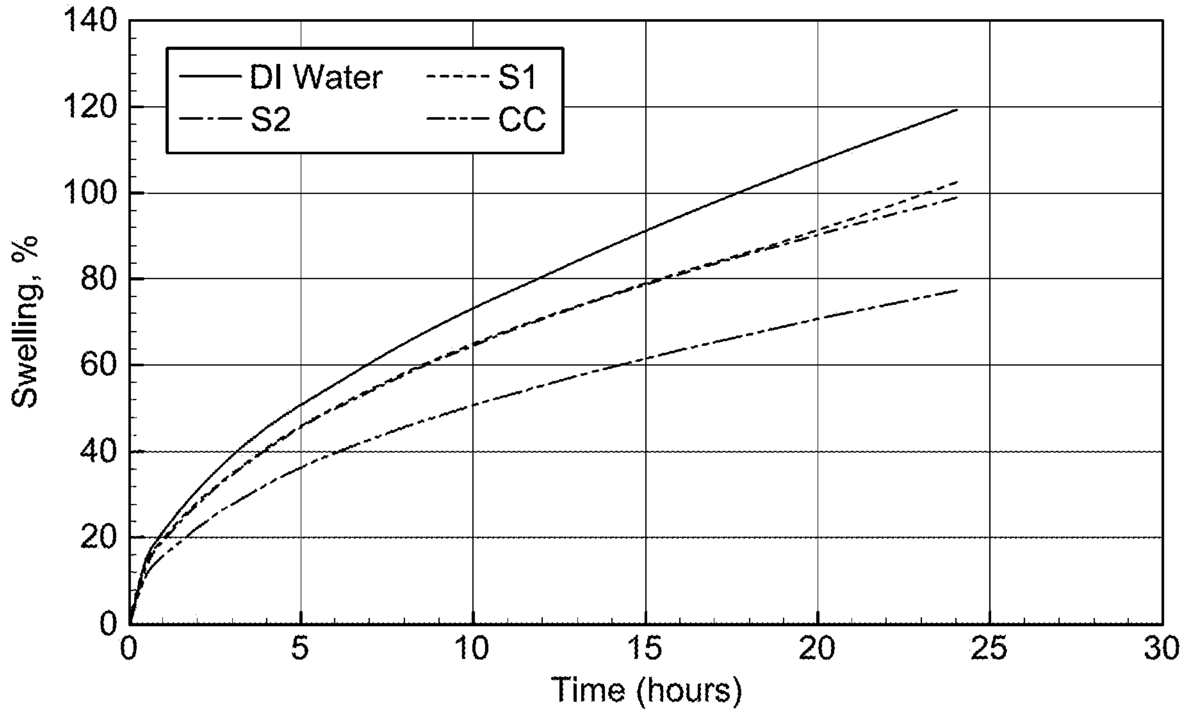
FIG. 3A shows linear swelling curves of clay dispersed in deionized water (DI), two different amphiphiles including S1 and S2 and chlorine chloride (CC) aqueous solutions, according to certain embodiments.
Figure 3B:
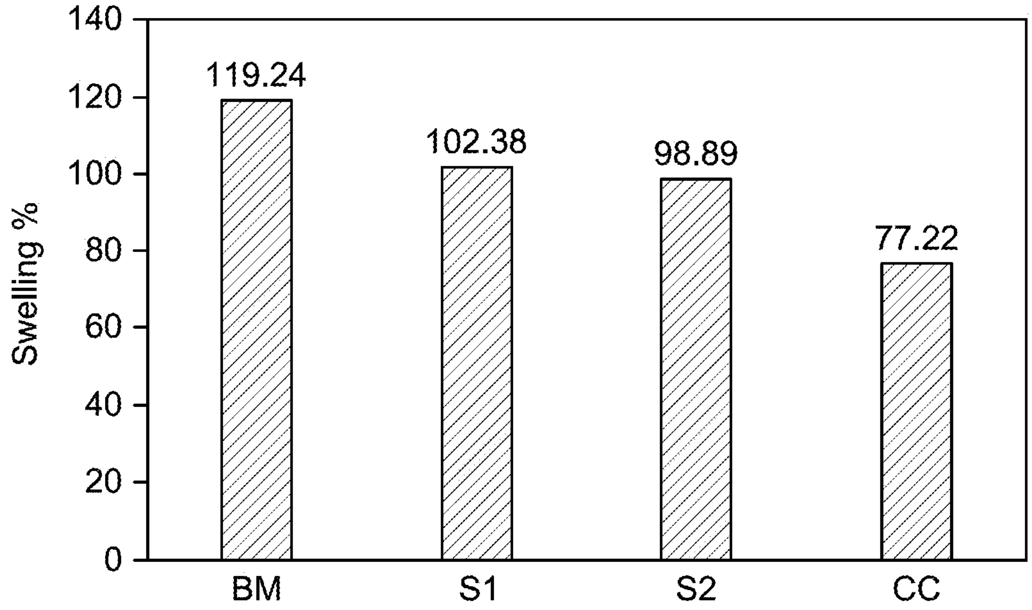
FIG. 3B shows clay swelling after 24 hours in DI, S1, S2 and CC aqueous solutions, according to certain embodiments.

The swelling behavior of bentonite clay pellets was observed over time in different aqueous solutions, including DI water, amphiphiles S1, and S2 solutions and a CC solution as a commercial additive, as shown in FIG. 3A and FIG. 3B. DI water caused larger amounts of clay swelling, with an increase of over 120% after 24 h. In contrast, both amphiphiles S1 and S2 effectively inhibited clay swelling, with S2 demonstrating slightly better performance. The presence of amphiphiles S1 and S2 resulted in lower swelling percentages compared to DI water, indicating efficiency in reducing swelling. Moreover, the commercial CC solution outperformed both amphiphiles and DI water, resulting in the least swelling among the tested solutions. The clay swelling after 24 h, with the effectiveness ranked as CC>S2>S1>DI water.

Figure 4:
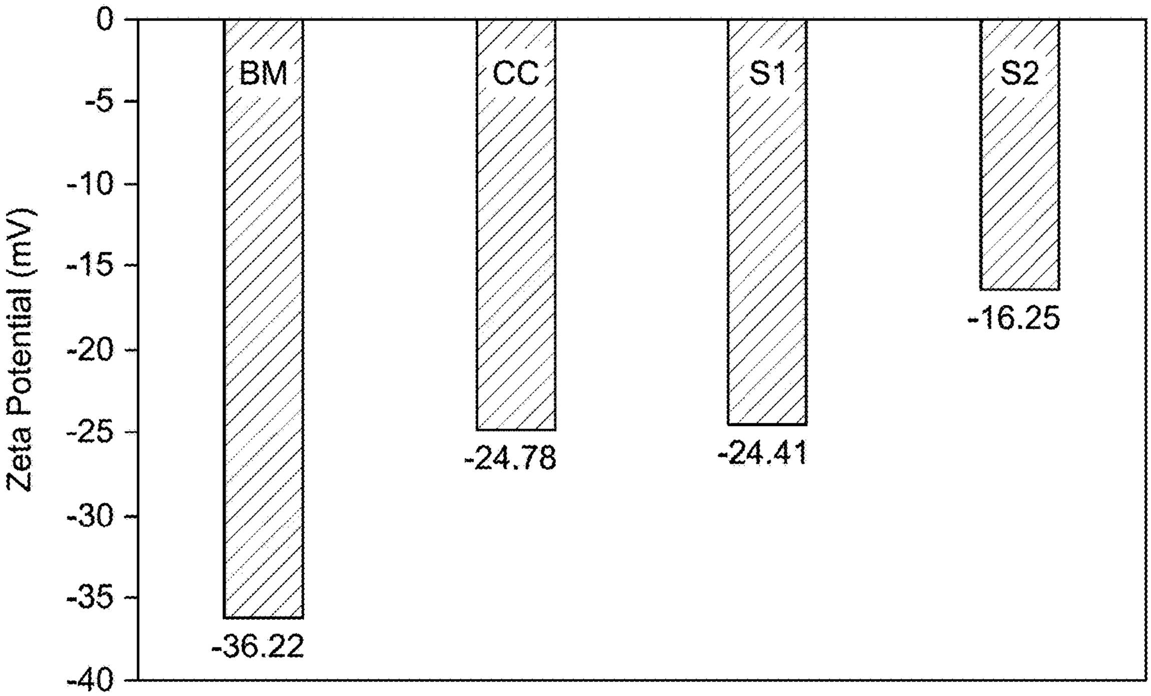
FIG. 4 depicts a bar graph of zeta potential measurements for clay dispersed in deionized water (BM), S1, S2, and CC aqueous solutions, according to certain embodiments.

Further, FIG. 4 shows a bar chart illustrating the zeta potential of clay particles dispersed in four different fluids including clay dispersed in deionized water (BM), clay dispersed in CC, and clay dispersed in two different amphiphiles (S1, and S2). Zeta potential, measured in millivolts (mV), is a parameter for evaluating the stability of colloidal dispersions. A higher magnitude of zeta potential, whether positive or negative, indicated greater electrostatic repulsion between particles, resulting in a more stable dispersion. In DI, the zeta potential of clay particles was −36.22 mV. This high negative value indicated strong electrostatic repulsion between the clay particles, resulting in a stable dispersion where the particles remained well-separated and suspended. This value served as a baseline for comparing the effects of other fluids on the stability of clay particles. When the clay was dispersed in CC, the zeta potential decreased to −24.78 mV, indicating reduced electrostatic repulsion and a less stable dispersion compared to DI. The less negative value compared to the baseline indicates a decrease in electrostatic repulsion between the particles.

The presence of CC ions likely compressed the electrical double layer around the clay particles, reducing repulsive forces and potentially leading to particle aggregation or flocculation. This demonstrated the impact of ionic strength on the dispersion stability of clay particles. For clay dispersed in S1, the zeta potential was −24.41 mV, which was comparable to the value observed in CC. The reduction in zeta potential indicated that S1 decreased the repulsive forces between clay particles, likely through adsorption onto the clay surface and partial neutralization of the surface charge. The similarity in zeta potential values between S1 and CC indicated that both additives exerted a similar effect on the electrostatic stability of the clay dispersion. In contrast, the most change was observed with S2, where the zeta potential was −16.25 mV. This less negative value indicated a substantial reduction in electrostatic repulsion, implying that S2 was highly effective in modifying the surface charge of the clay particles. The strong adsorption of S2 onto the clay surface led to a decrease in zeta potential, which may enhance the likelihood of particle aggregation, as supported by the particle size analysis.

Figure 5:
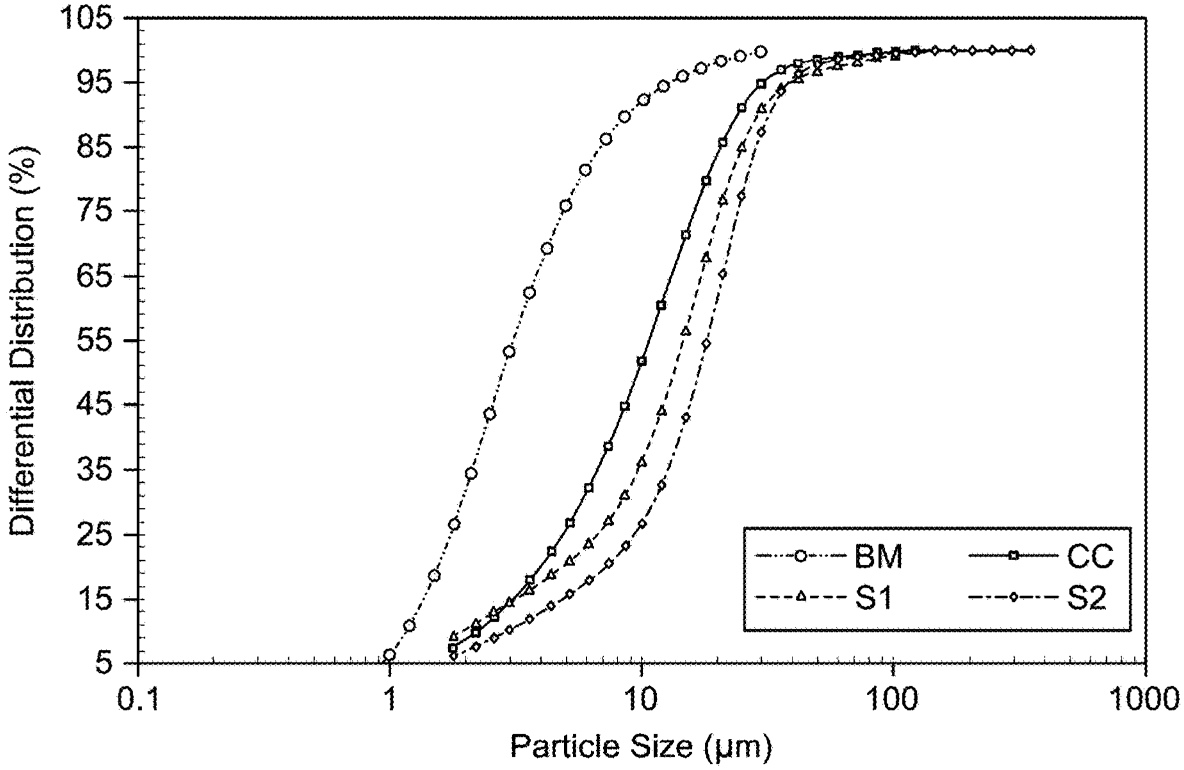
FIG. 5 shows a differential particle distribution graph of clay mixed in BM, S1, S2, and CC aqueous solutions, according to certain embodiments.

FIG. 5 shows the differential particle size distribution of clay mixed in DI, S1, S2 and CC solutions. The particle size distribution chart revealed that BM without amphiphiles provided a baseline with well-dispersed, small particles. In the presence of CC, a moderate increase in particle size was observed, indicating slight aggregation. S1 induced further particle size growth, resulting in greater aggregation compared to CC. The most substantial increase in particle size was observed with S2, leading to the largest particle sizes and strongest aggregation. This observation indicated that S2 had a greater effect on inducing particle aggregation compared to S1, highlighting S2 amphiphile's more pronounced impact on altering the dispersion stability of the clay particles.

Figure 6:
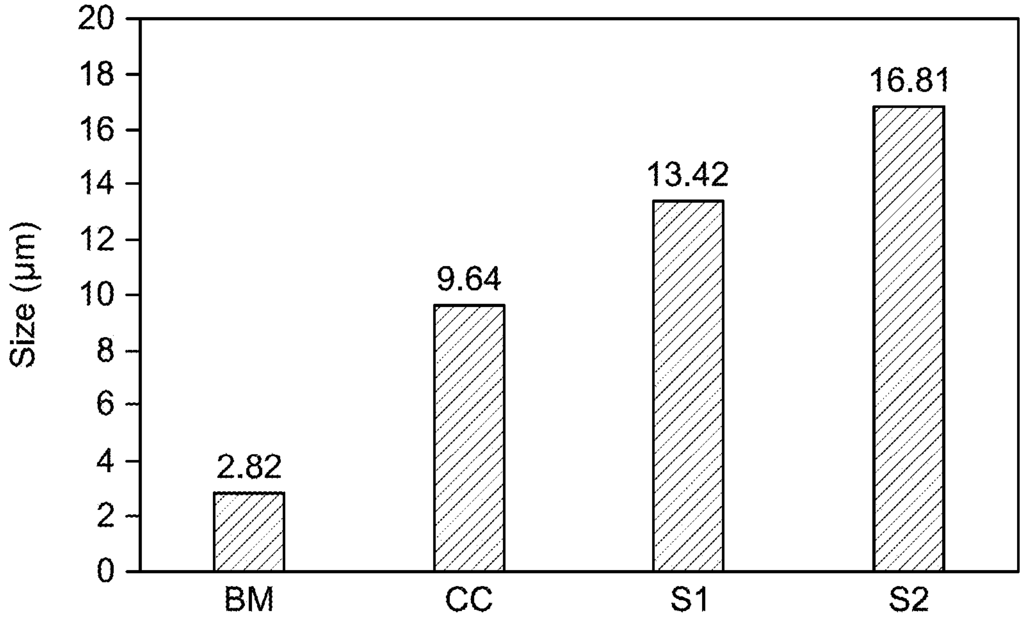
FIG. 6 is a bar graph depicting an average particle size (d50) of clay mixed in BM, S1, S2, and CC aqueous solutions, according to certain embodiments.
Figure 7:
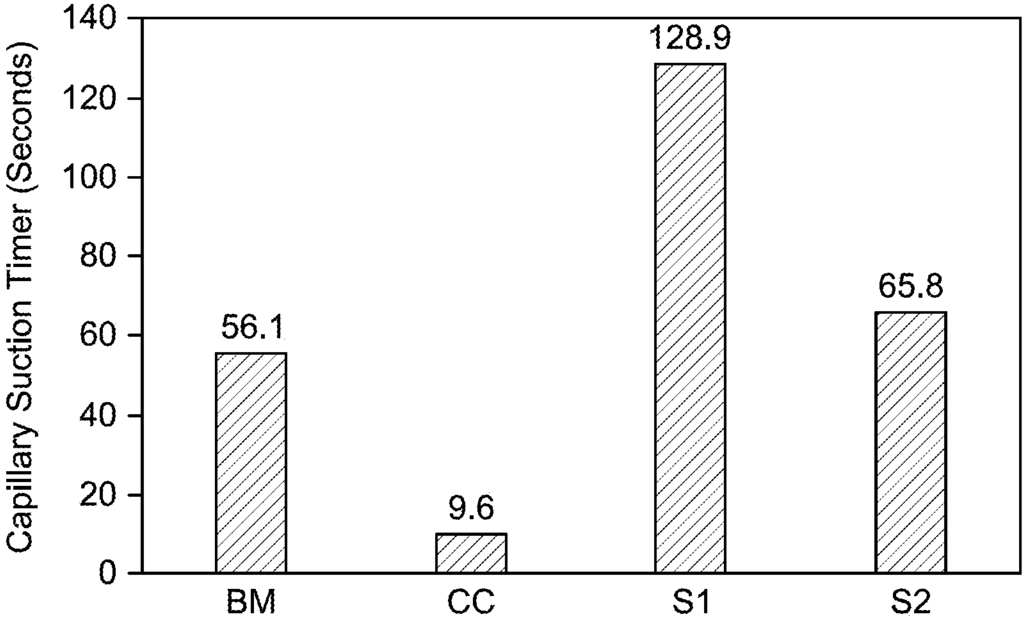
FIG. 7 shows capillary suction timer (CST) values for clay dispersed in BM, S1, S2, and CC aqueous solutions, according to certain embodiments.

Furthermore, the average particle size (d50) of clay samples is shown in FIG. 6. The reference sample (BM), consisting of clay dispersed in DI water, exhibited a d50 value of 2.82 micrometer (μm) and a zeta potential of −36.22 mV. The relatively small particle size, combined with the highly negative zeta potential indicates a well-dispersed and stable suspension. The strong electrostatic repulsion between particles effectively prevents aggregation, thus maintaining a fine particle size distribution. In contrast, when the clay was dispersed in CC, the d50 value increased to 9.64 μm, and the zeta potential became less negative at −24.78 mV. The larger particle size indicated that the ionic strength of CC reduced the electrostatic repulsion, facilitating particle aggregation and resulting in larger particles. The influence of amphiphiles on particle size was further elucidated in the cases of S1 and S2. For S1, the d50 value was 13.42 μm, and the zeta potential was −24.41 mV. The increase in particle size indicated aggregation, while the zeta potential indicated that S1 neutralized the surface charge similarly to CC. This reduction in electrostatic repulsion facilitated increased particle aggregation. However, S2 exhibited the most pronounced effect, with a d50 value of 16.81 μm and a zeta potential of −16.25 mV. This substantial increase in particle size, along with the least negative zeta potential, indicated the highest degree of aggregation among the tested samples. The strong neutralization of the surface charge by S2 reduced electrostatic repulsion, leading to substantial particle clustering and a greater degree of aggregation. The CST values for clay dispersed in four different solutions: BM (deionized water), CC, S1, and S2 is shown in FIG. 7. The CST values, measured in seconds(s), represent the duration required for the filtrate to travel between two electrode sets. In the BM solution, the CST value was 56.1 s, indicating a moderate level of water absorption and swelling. This indicated that the clay particles were well-dispersed, resulting in balanced absorption and minimal aggregation. The clay slurry remained relatively stable, allowing for a steady rate of water absorption. In contrast, in CC, the CST value drops to 9.6 s, indicating very rapid water absorption. The increased ionic strength of CC reduces the electrostatic repulsion between clay particles, leading to increased aggregation of particles and reduced uptake of water by the clays. The introduction of S1 into the clay dispersion resulted in the highest CST value of 128.9 s, indicating a notably slow water absorption rate. The high CST value indicates that S1 reduces the permeability of the clay matrix, potentially due to the formation of a more compact and less permeable structure. The surfactant's interaction with the clay particles creates a denser network that hinders water flow, resulting in the observed high CST value. On the other hand, S2 has a CST value of 65.8 s, which was higher than those of BM and CC but lower than S1. This moderate level of water absorption indicates that S2 induces some aggregation of the clay particles, though to a lesser extent than S1. The resulting structure was less permeable than that formed with S1 but more permeable than those formed with BM and CC.

Figure 8:
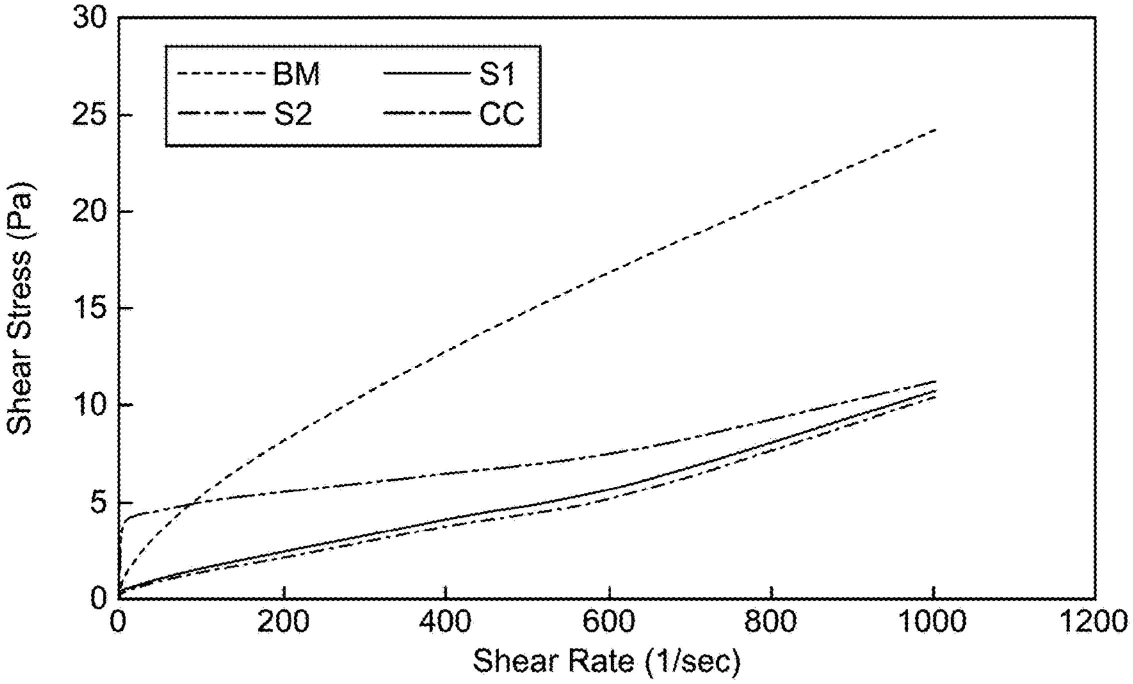
FIG. 8 is a plot for shear stress versus shear rate graph for muds, including base mud (BM), surfactant-mixed muds (S1, S2), and chlorine chloride-mixed mud (CC), according to certain embodiments.
Figure 9:
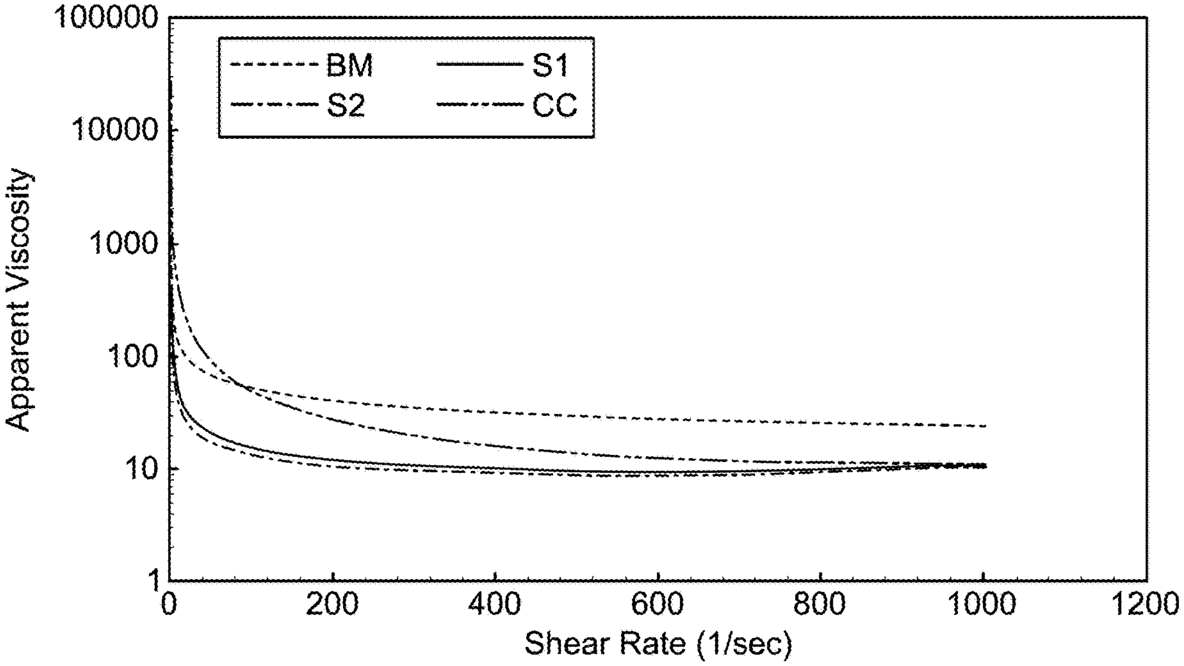
FIG. 9 is a plot for viscosity versus shear rate graph for muds BM, S1, S2, and CC, according to certain embodiments.

The shear stress versus shear rate curves for various formulations, including BM, surfactant-mixed muds (S1, S2), and CC-mixed mud (CC) is shown in FIG. 8. The chart indicated that the BM consistently exhibited high shear stress across the entire range of shear rates tested. In contrast, the surfactant-mixed muds (S1 and S2) show a reduction in shear stress at comparable shear rates, with S2 demonstrating the lowest shear stresses among all the tested formulations. The reduction in shear stress demonstrated the incorporation of amphiphiles, which alters the rheological behaviors of the muds, resulting in less flow resistance and a less organized internal matrix than BM. The CC mixed mud exhibits an anomalous behavior, with considerable stress at low shear rates, but aligns with S1 and S2 at higher shear rates. This reduction in shear stress at elevated shear rates demonstrated the shear-thinning behavior of the muds. Similar behavior was observed in the viscosity profiles, as shown in FIG. 9. The apparent viscosity decreased at higher shear rates. This reduction in viscosity at elevated shear rates reduces the stress on circulating pumps and mitigated the risk of lost circulation due to an increase in equivalent circulating density. Overall, the addition of amphiphiles S1 and S2 distinctly affects the rheological behavior of the muds, potentially benefiting drilling operations by improving flow properties and lowering mechanical stress on the circulation system.

Figure 10:
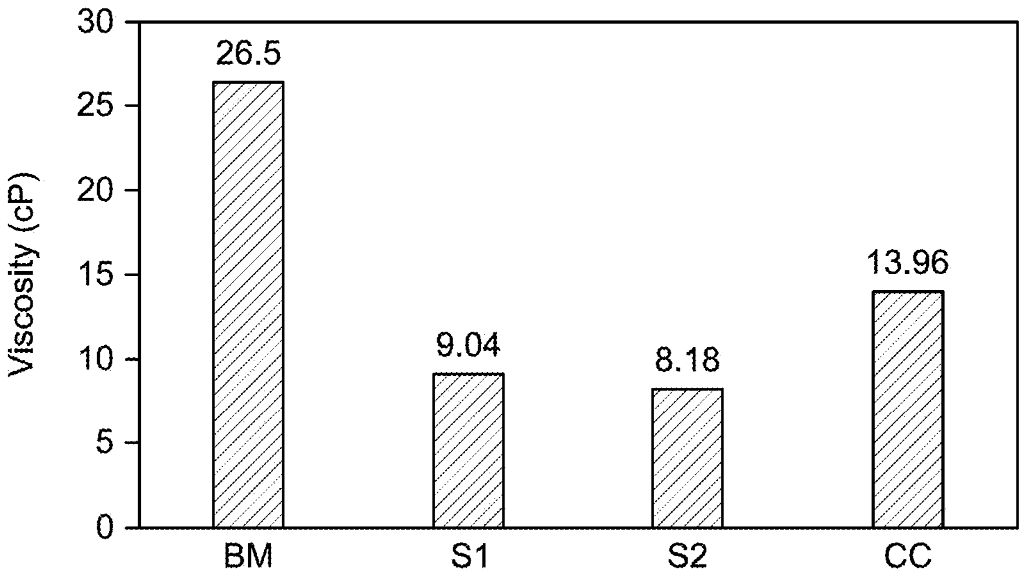
FIG. 10 shows viscosity values at 511 second inverse ($s^{-1}$) for muds BM, S1, S2, and CC, according to certain embodiments.

FIG. 10 shows the viscosity measurements conducted at a shear rate of 511 $s^{-1}$ of four different mud samples, including BM, S1, S2, and CC. The BM exhibited the highest viscosity among the samples, with a value of 26.5 centipoise (cP). The high viscosity value demonstrated a relatively strong internal resistance to flow, which was characteristic of a mud with particle-particle interactions and a more structured internal matrix. However, the surfactant-mixed muds (S1, S2), show lower viscosity values. Specifically, the S1-mixed mud has a viscosity value of 9.04 cP, whereas the S2-mixed mud shows a slightly lower viscosity value of 8.18 cP. Meanwhile, the commercially available CC-mixed mud (CC) exhibited an intermediate viscosity of 13.96 cP, which was higher than the amphiphile-mixed muds but lower than the BM. This substantial reduction in viscosity compared to the BM indicated that the amphiphiles (S1, S2) and CC-mixed mud (CC) disrupted the interactions among the clay particles. This disruption led to a less viscous and more fluid system, as the amphiphiles likely reduced the attractive interactions between particles, thereby weakening the overall structure and cohesiveness of the mud.

Overall, the addition of amphiphiles altered the rheological properties of the BM, resulting in lower viscosity in the treated muds. This reduction in viscosity offers advantages in drilling operations, as it improves mud circulation, reduces energy requirements for pumping, and mitigates issues associated with high equivalent circulating density (ECD), such as lost circulation and wellbore instability.

Figure 11:
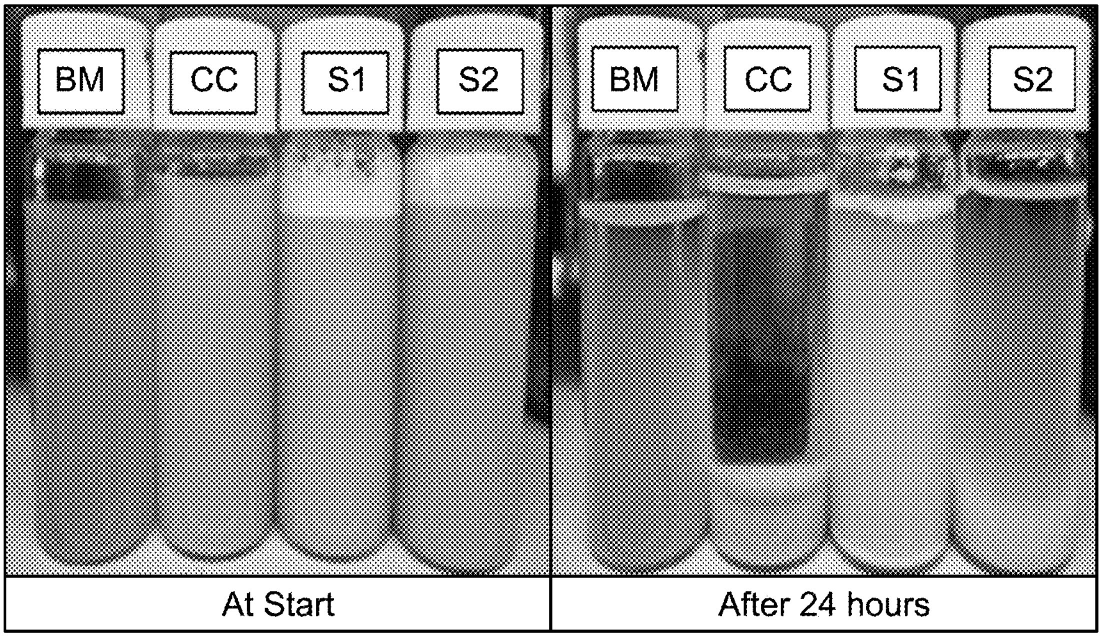
FIG. 11 is a pictorial illustration at start and after 24 hours (h) of the clay dispersion test performed for BM, S1, S2, and CC aqueous solutions, according to certain embodiments.

The dispersion behavior of clay particles in four different fluids is shown in FIG. 11, depicting a pictorial illustration at start and after 24 h of the clay dispersion test performed for BM, S1, S2, and CC aqueous solutions. The type of fluid influenced clay dispersion. The base sample (DI water) exhibited the most stable dispersion, with minimal settling of clay particles after 24 h, indicating strong colloidal stability. By contrast, the CC mixed solution demonstrated the highest degree of instability, leading to clay particle settling, which indicated a strong flocculation effect and reduced dispersion stability. The S1 solution effectively maintained clay dispersion, although some particle settling was observed. Meanwhile, the S2 solution exhibited greater particle settling and reduced dispersion compared to both DI water and S1. For inhibitors, a higher clay settling rate indicates more effective suppression of clay swelling and dispersion.

To conclude, the present disclosure provides synthesis of amphoteric amphiphiles as swelling inhibitors in oil and gas wells, specifically targeting the issue of shale swelling during drilling operations. Amphoteric amphiphiles demonstrated robust inhibition potential against shale swelling, surpassing traditional methods. The addition of amphiphiles resulted in a notable reduction in linear swelling compared to deionized water, confirming the effectiveness of the synthesized inhibitors. The incorporation of amphiphiles led to a decrease in the negativity of zeta potential in mixed fluids, with the most pronounced change observed in S2 mixed fluid, indicating enhanced clay stability. The introduction of inhibitors successfully increased the clay particle size, effectively preventing clay dispersion and leading to better stabilization within the drilling fluid. Rheological measurements revealed a substantial reduction in viscosity for the surfactant-mixed muds compared to BM and CC-mixed mud, demonstrating enhanced fluid performance. This reduction in viscosity, along with shear stresses, highlights the friction reduction properties of the tested amphiphiles. Among the amphiphiles tested, S2 exhibited increased inhibition potential, proving to be a more effective solution for shale swelling inhibition compared to S1. Additionally, the amphiphiles help prevent the bit balling effect, which commonly occurs with the use of salt-based inhibitors. The performance of the synthesized amphiphiles (S1 and S2) was on par with, and in some cases exceeded, that of existing commercial additives, underscoring the potential for widespread application in the oil and gas industry.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A shale swelling inhibiting composition comprising a water-based drilling mud and an amphiphilic polymer selected from the group consisting of S1, S2, and combinations thereof, wherein the structure of S1 is:

S1

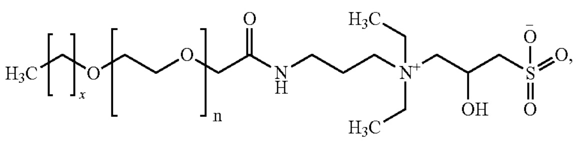

the structure of S2 is:

S2

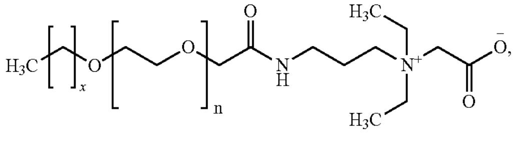

wherein the shale swelling inhibiting composition comprises from 0.01 to 20 weight percent (wt. %) of the amphiphilic polymer based on the total weight of the shale swelling inhibiting composition, wherein x is in a range from 11 to 13 and n is in a range from 8 to 10, wherein the water-based drilling mud comprises bentonite particles and water, wherein the bentonite particles are dispersed in the water and have a zeta potential in a range from −25 to −15 mV, and wherein the composition has a viscosity in a range from 8 to 10 cP measured at 500 second inverse ($s^{-1}$).

2. The composition of claim 1, wherein the water-based drilling mud comprises bentonite particles in a concentration of 6 wt. %, based on the total weight of the water-based drilling mud.

* * * * *